US011899410B1

(12) United States Patent
Jamison et al.

(10) Patent No.: US 11,899,410 B1
(45) Date of Patent: Feb. 13, 2024

(54) MONITORING A WELLBORE OPERATION USING DISTRIBUTED ARTIFICIAL INTELLIGENCE

(71) Applicant: Halliburton Energy Services, Inc., Houston, TX (US)

(72) Inventors: Dale E. Jamison, Humble, TX (US); Daniel Joshua Stark, Houston, TX (US); Andrew Vos, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/082,166

(22) Filed: Dec. 15, 2022

(51) Int. Cl.
*G05B 13/02* (2006.01)
*E21B 41/00* (2006.01)
*G01M 99/00* (2011.01)
*G08B 21/08* (2006.01)
*G08B 21/18* (2006.01)

(52) U.S. Cl.
CPC .......... *G05B 13/0265* (2013.01); *E21B 41/00* (2013.01); *G01M 99/005* (2013.01); *G08B 21/182* (2013.01)

(58) Field of Classification Search
CPC .... E21B 41/00; G01M 99/005; G05B 21/182; G05B 13/0265
See application file for complete search history.

(56) References Cited

U.S. PATENT DOCUMENTS

| | | | | |
|---|---|---|---|---|
| RE42,245 E | * | 3/2011 | Thomas | E21B 43/20 |
| | | | | 702/13 |
| 11,365,623 B2 | * | 6/2022 | Short | E21B 41/00 |
| 2004/0093516 A1 | | 5/2004 | Hornbeek et al. | |

(Continued)

FOREIGN PATENT DOCUMENTS

| | | | |
|---|---|---|---|
| CN | 109798102 A | * | 5/2019 |
| CN | 112365583 A | * | 2/2021 |

(Continued)

OTHER PUBLICATIONS

Non-Final Office Action, U.S. Appl. No. 18/082,217, dated Feb. 15, 2023, 23 pages.
U.S. Appl. No. 18/082,217, "Advisory Action", dated Jul. 31, 2023, 4 pages.
U.S. Appl. No. 18/082,217, "Final Office Action", dated May 25, 2023, 17 pages.
International Search Report and Written Opinion, PCT/US2023/031129, dated Dec. 7, 2023, 11 pages.

*Primary Examiner* — Ronald D Hartman, Jr.
(74) *Attorney, Agent, or Firm* — Kilpatrick Townsend & Stockton LLP

(57) ABSTRACT

Distributed artificial intelligence (AI) can be used to monitor a wellbore operation in some examples described herein. In one such example, physical equipment can be positioned at a surface of a wellsite to support a drilling operation at the wellsite. Each piece of physical equipment may include a sensor module, a processor communicatively coupled to the sensor module, and a memory. The memory can include an AI module configured to determine a condition associated with the equipment by analyzing sensor data from the sensor module using one or more machine-learning models. The memory additionally can include a warning module for causing the processor to output a warning notification based on the condition. The memory further can include a communications module for causing the processor to transmit a communication indicating the condition to a destination via a network. The communication may be different from the warning notification.

20 Claims, 5 Drawing Sheets

(56) References Cited

U.S. PATENT DOCUMENTS

| | | | |
|---|---|---|---|
| 2004/0124012 A1* | 7/2004 | Dunlop | E21B 44/00 |
| | | | 175/57 |
| 2005/0218841 A1 | 10/2005 | Marks et al. | |
| 2007/0156253 A1 | 7/2007 | De | |
| 2007/0270984 A1 | 11/2007 | Lobig et al. | |
| 2007/0284147 A1* | 12/2007 | Moran | E21B 44/00 |
| | | | 702/9 |
| 2009/0222687 A1 | 9/2009 | Baker | |
| 2013/0066471 A1* | 3/2013 | Wang | G05B 13/024 |
| | | | 700/275 |
| 2014/0277752 A1* | 9/2014 | Chang | E21B 44/00 |
| | | | 700/275 |
| 2015/0129306 A1* | 5/2015 | Coffman | E21B 44/00 |
| | | | 175/48 |
| 2015/0192936 A1 | 7/2015 | Kelly et al. | |
| 2015/0293779 A1 | 10/2015 | Gamer et al. | |
| 2020/0208510 A1 | 7/2020 | Guijt et al. | |
| 2020/0327423 A1 | 10/2020 | Zheng et al. | |
| 2021/0062619 A1 | 3/2021 | Camacho Cardenas et al. | |
| 2022/0127932 A1* | 4/2022 | Yepez | G01B 21/18 |
| 2022/0381120 A1 | 12/2022 | Nimbalkar et al. | |
| 2022/0404788 A1 | 12/2022 | Amaro, Jr. et al. | |
| 2023/0096078 A1* | 3/2023 | Annaiyappa | G06Q 10/0635 |
| | | | 166/250.01 |

FOREIGN PATENT DOCUMENTS

| | | | | |
|---|---|---|---|---|
| EP | 2416464 A2 | 2/2012 | | |
| WO | 9836335 A2 | 8/1998 | | |
| WO | 2008022106 A1 | 2/2008 | | |
| WO | WO-2009058635 A2 * | 5/2009 | | E21B 41/00 |
| WO | 2017059152 A1 | 4/2017 | | |
| WO | WO-2020061134 A1 * | 3/2020 | | |
| WO | 2020131702 A1 | 6/2020 | | |
| WO | 2021184614 A1 | 9/2021 | | |

* cited by examiner

MONITORING A WELLBORE OPERATION USING DISTRIBUTED ARTIFICIAL INTELLIGENCE

TECHNICAL FIELD

The present disclosure relates generally to wellbore operations and, more particularly (although not necessarily exclusively), to monitoring a wellbore operation using distributed artificial intelligence.

BACKGROUND

A wellbore can be formed in a subterranean formation at a wellsite for extracting produced hydrocarbon or other suitable material. A wellbore operation, such as a drilling operation, can be performed at the wellsite to extract the produced hydrocarbon material or perform other suitable tasks relating to the wellbore. During the wellbore operation, an operator can use physical equipment at a surface of the wellsite to support the wellbore operation. But the operator can make mistakes when using the physical equipment that can impact the wellbore operation. For example, the operator can forget to close a flow valve for a tank, thereby incorrectly diluting a mixture that is generated downstream from the tank.

DETAILED DESCRIPTION

Figure 1:
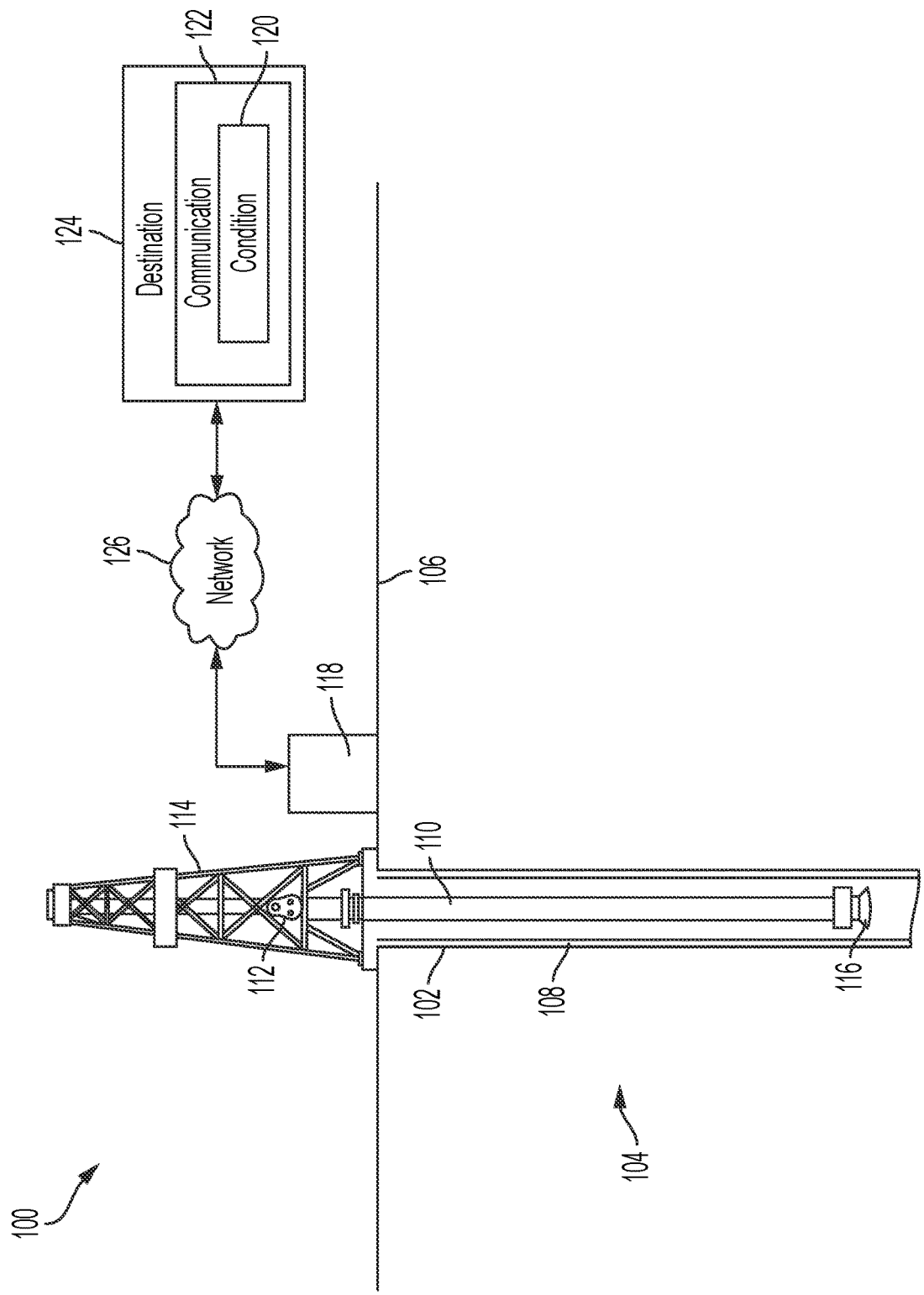
FIG. 1 is an example of a wellsite that includes a distributed artificial intelligence (AI) system according to some aspects of the present disclosure.

Certain aspects and features of the present disclosure relate to monitoring a wellbore operation using distributed artificial intelligence (AI). Distributed artificial intelligence (AI) is a type of AI that uses a parallel system for computing. A distributed AI system can include processing components that are loosely coupled and can function independently from each other. The wellbore operation can include at least one piece of physical equipment for a wellsite being positioned at a surface of a wellbore that is formed through a subterranean formation. The piece of physical equipment can include hardware equipment that is primarily designed to perform a physical task (e.g., pumping, storage of liquids or solids, or screening) at the wellsite. A sensor module can be included in the piece of physical equipment to collect sensor data associated with the piece of physical equipment. Additionally, the piece of physical equipment can include an AI module for analyzing the sensor data from the sensor module using a machine-learning model. By using the AI module to analyze the sensor data, the piece of physical equipment can determine a condition associated with the piece of physical equipment. A communications module in the piece of physical equipment can transmit a communication containing the condition to a destination via a network. In some examples, the destination may include one or more other pieces of physical equipment with their own sensor modules and AI modules, which can incorporate the received condition into their own analysis. Using these techniques, a network of distributed physical equipment that is AI enabled can be established at the wellsite to allow for integrated analysis of multiple equipment conditions. Based on this integrated analysis, a piece of physical equipment can adjust its operational settings or command other pieces of physical equipment to adjust their operational settings, for example to resolve current problems or avoid future problems. The pieces of physical equipment may also issue warnings to allow a human operator to intervene.

In some cases, human error can lead to hazards in a wellbore operation. For example, an operator can forget to replace a deteriorated component in the piece of physical equipment, causing the piece of physical equipment to malfunction or break. Using distributed AI to monitor the wellbore operation can decrease a likelihood of the hazards occurring. For example, the distributed AI can allow the pieces of well equipment to interact with one another to make more informed and intelligent decisions about their own operation as well as the overall progress of the well operation. This interaction may allow the system to identify potential hazards that may not be readily apparent from analyzing sensor data from a single piece of equipment. Adjustments can then be automatically made to the settings of one or more pieces of equipment to avoid or mitigate such hazards. Additionally or alternatively, implementing distributed AI to monitor the wellbore operation can be quicker than other methods, thereby allowing relatively quick remediation in instances when issues arise. For example, multiple pieces of equipment can analyze sensor data in parallel and coordinate their results to identify problems more efficiently and quickly and to implement remediation tasks. This method is unlike traditional methods of monitoring a wellbore operation, in which an operator enters the wellsite to manually check for hazards such as deterioration in a piece of physical equipment, which can require significant time and exertion. Using parallel processing and intelligent coordination, the distributed AI can identify and preemptively warn a user of a potential problem, enabling the user to take preventative or corrective action.

As noted above, distributed AI can enable relatively quick data processing and problem resolution for wellbore operations by applying complex learning methods within segments of a process. Discrete component-level application of AI methods can provide an ability to process and analyze relatively large amounts of data and generate relatively fast problem resolution. In some examples, distributed AI can use a parallel system for computing. In these examples, one or more learning nodes can be independent of each other and can reside in various system components. In some examples, the physical equipment at the wellsite can serve as the learning nodes and perform the parallel processing. Using parallel processing can allow a distributed AI system to use computational resources more efficiently compared to a centralized AI system.

Due to the processing power of the distributed AI system, a data set can be analyzed relatively quickly, with each part of the data set being analyzed by a separate learning node. Each separate learning node can determine an individual solution based on the part of the data set being analyzed. For example, a first learning node can be an AI-enabled storage tank located at a wellsite. The storage tank can generate a first individual solution using data corresponding to the tank. Similarly, a second learning node can be an AI-enabled shale shaker that is also located at the wellsite. The shale shaker can generate a second individual solution using data corresponding to the shaker. Integration of each individual solution into a system solution can be implemented using a communication system between each learning node. For example, the storage tank and shale shaker can communicate their respective solutions to one another and use that information to generate a system solution that takes into account both individual solutions. The pieces of physical equipment can interact with each other in real time or in bursts to deliver data as needed.

Each of the AI modules of the pieces of physical equipment can be further trained over time to improve their accuracy and abilities. For example, each piece of physical equipment can further train its respective AI module based on collected sensor data from its own sensor module or other sensor modules of other pieces of physical equipment. Training data sets for each system component may be updated over time and at different intervals.

These illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is an example of a wellsite 100 that includes a distributed artificial intelligence (AI) system according to some aspects of the present disclosure. As depicted in FIG. 1, the wellsite 100 includes a wellbore 102 drilled through a subterranean formation 104. The wellbore 102 extends from a well surface 106 into strata of the subterranean formation 104. The strata can include different materials (e.g., rock, soil, oil, water, or gas) and can vary in thickness and shape. In some examples, the wellsite 100 may include more than one wellbore 102. Additionally, the wellbore 102 can be vertical as depicted, deviated, horizontal, or any combination of these.

The wellbore 102 can be cased, open-hole, or a combination of these. For example, a casing string 108 can extend from the well surface 106 through the subterranean formation 104. The casing string 108 may provide a conduit through which formation fluids, such as production fluids produced from the subterranean formation 104, can travel from the wellbore 102 to the well surface 106. In some examples, the casing string 108 can be coupled to the walls of the wellbore 102 via cement. For example, a cement sheath can be positioned or formed between the casing string 108 and walls of the wellbore 102 for coupling the casing string 108 to the wellbore 102.

The wellbore 102 additionally can include one or more well tools, such as well tool 110. In the example shown in FIG. 1, the well tool 110 is positioned in the wellbore 102 by a winch 112 in a derrick 114 positioned above the well surface 106. But in other examples, the well tool 110 may be positioned in the wellbore 102 in another manner. The well tool 110 can be coupled to a wireline, a slickline, or coiled tubing for positioning the well tool 110 in the wellbore 102. The well tool 110 can be conveyed into the wellbore by manipulating the wireline, slickline, or coiled tubing using, for example, a guide or the winch. For example, if the wellbore operation is a drilling operation, the well tool 110 may be part of a drill string for drilling the wellbore 102 and conveyed downhole during drilling operations. Additionally, the well tool 110 can include a drill bit 116 positioned in the well tool 110 for drilling at least a portion of the wellbore 102 through the subterranean formation 104.

The well tool 110 additionally or alternatively can include various subsystems, such as a logging-while drilling (LWD) module, a measuring-while-drilling (MWD) module, a rotary steerable system, a motor, or any combination of these. At least one of the subsystems may measure properties of the rocks, fluid, or other contents of the subterranean formation 104. The drill bit 116 and one or more subsystems can be incorporated into a bottom hole assembly of the well tool 110.

Multiple pieces of physical equipment, such as physical equipment 118, can be positioned above the well surface 106 in the wellsite 100 for supporting the wellbore operation. The pieces of physical equipment can perform a physical task, such as storing lost-circulation materials, pumping drilling fluid, or the like. Examples of the piece of physical equipment 118 may include a shaker, a centrifuge, a cuttings box, a mud tank, a pump, a sack, or a pallet. The pieces of physical equipment can be equipped with AI capabilities and communication interfaces, for example to allow the pieces of physical equipment to perform distributed AI processing and other coordinated tasks.

Each piece of physical equipment can be primarily designed to perform a physical task at the wellsite 100, though each piece of the physical equipment can also include processing capabilities for performing the AI functionality and other computerized tasks. For example, the piece of physical equipment 118 can include a processor interfaced with a sensor module, a communications interface, and a memory via a bus. The memory can include any suitable tangible (and non-transitory) computer-readable medium, such as RAM, ROM, EEPROM, or the like. The memory can store program code that is executable by the processor to configure operation of the piece of physical equipment 118. In some aspects, the piece of physical equipment 118 can include input/output interface components (e.g., a display, printer, keyboard, touch-sensitive surface, and mouse) and additional storage. Using these features, the physical equipment can perform the AI functionality and other computerized tasks, though the physical equipment is not primarily designed for computer processing.

Each piece of physical equipment may also include a respective AI module, which can be software that is executed by the processor. The AI module can include one or more machine-learning models, which are described in greater detail later on. The one or more machine-learning models may be at least partially trained before the physical equipment is deployed at the wellsite 100, at least partially trained after the physical equipment is deployed at the wellsite 100, or both.

In some examples, each piece of physical equipment can use its respective AI module to analyze sensor data from its sensor module to identify one or more conditions. For example, the physical equipment 118 can analyze sensor data from its sensor module for determining a condition 120 associated with the piece of physical equipment 118. The condition 120 may also be determined based on other information, such as by analyzing sensor data from another piece of physical equipment that is in networked communication with the physical equipment 118. Having determined the condition 120, the piece of physical equipment can transmit a communication 122 containing the condition 120 to a destination 124 via a network 126, such as the Internet. In some examples, the destination 124 may be another piece of physical equipment or a centralized control system. Further details about the piece of physical equipment 118 are described below with respect to FIG. 2.

Figure 2:
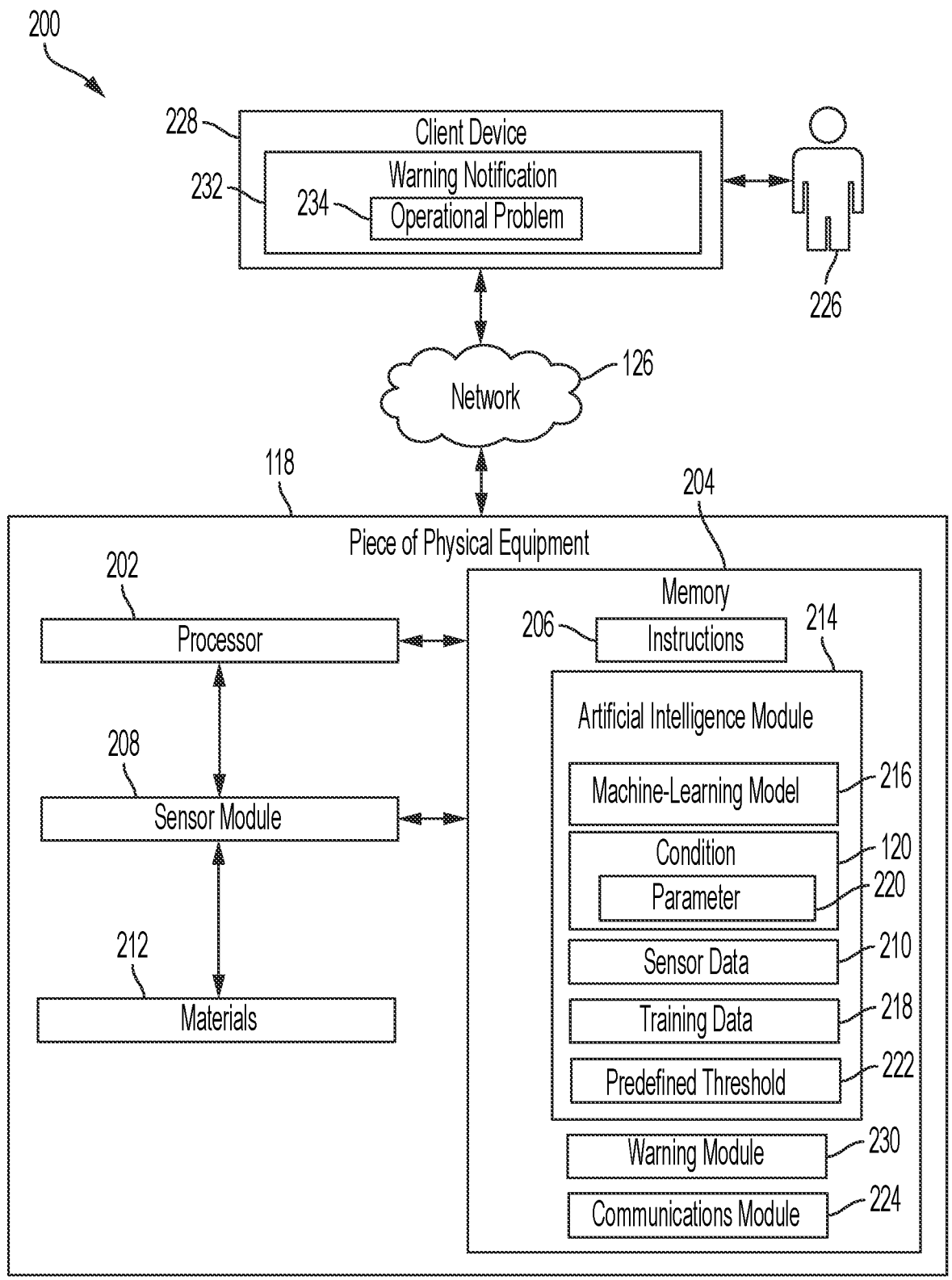
FIG. 2 is a block diagram of an example of a system that includes a piece of physical equipment with artificial intelligence according to some aspects of the present disclosure.

FIG. 2 is a block diagram of an example of a system 200 that includes a piece of physical equipment 118 with artificial intelligence according to some aspects of the present disclosure. As shown, the piece of physical equipment 118 can include a processor 202 communicatively coupled to a memory 204. The processor 202 is hardware that can include one processing device or multiple processing devices. Non-limiting examples of the processor 202 include a Field-Programmable Gate Array (FPGA), an application-specific integrated circuit (ASIC), or a microprocessor. The processor 202 can execute instructions 206 stored in the memory 204 to perform computing operations. The instructions 206 may include processor-specific instructions generated by a compiler or an interpreter from code written in any suitable computer-programming language, such as C, C++, C#, Python, or Java.

The memory 204 can include one memory device or multiple memory devices. The memory 204 can be volatile or can be non-volatile, such that it can retain stored information when powered off. Some examples of the memory 204 can include electrically erasable and programmable read-only memory (EEPROM), flash memory, or any other type of non-volatile memory. At least some of the memory 204 includes a non-transitory computer-readable medium from which the processor 202 can read instructions 206. A computer-readable medium can include electronic, optical, magnetic, or other storage devices capable of providing the processor 202 with computer-readable instructions or other program code. Some examples of a computer-readable medium include magnetic disks, memory chips, ROM, random-access memory (RAM), an ASIC, a configured processor, optical storage, or any other medium from which a computer processor can read the instructions 206.

The processor 202 additionally may be communicatively coupled to a sensor module 208. The sensor module 208 can include at least one sensor for collecting sensor data 210 associated with the piece of physical equipment 118. Examples of such sensors can include a camera, a temperature sensor, an inclinometer, a pressure sensor, a force sensor, a conductivity sensor, a capacitance sensor, a level sensor, a resistivity sensor, a flow sensor, an accelerometer, a microphone, an accelerometer, a guided wave radar, or a radio frequency identification (RFID) reader. Additionally, the sensor module 208 may include spectroscopic capabilities, such as electrical impedance spectroscopy (EIS), acoustic resonance spectroscopy, circular dichroism spectroscopy, Raman spectroscopy, terahertz spectroscopy, ultraviolet spectroscopy, acoustic emission spectroscopy, or infrared spectroscopy. In some examples, the piece of physical equipment 118 can include a combination of sensors. For instance, if the piece of physical equipment 118 is a tank, the tank can include a flow sensor, a level sensor, a conductivity sensor, a capacitance sensor, or a combination of these for monitoring the flow rate and concentration of components in an exit stream of the tank. The sensor may collect the sensor data 210 in real time by taking a measurement at predetermined time intervals. The sensor data 210 can be stored in the memory 204 of the piece of physical equipment 118. Each sensor of the sensor module 208 can be positioned at any suitable location on the piece of physical equipment 118. For example, one or more sensors can be positioned at an inlet of the piece of physical equipment 118, an outlet of the piece of physical equipment 118, or a combination of these.

Additionally, the piece of physical equipment 118 can include physical hardware such as tubes, pumps, filters, screens, winches, pistons, engines, or any combination of these. The physical hardware can be used to store, transmit, or otherwise manipulate materials 212 used in the wellbore operation. Examples of the materials 212 can include lost-circulation materials, solid chemicals, liquid chemicals, or other suitable compounds used in the wellbore operation. At least some of the physical hardware may be designed to be replaced over time onsite, such as filters or other replaceable components.

In some examples, the piece of physical equipment 118 can communicate with an inventory management system regarding contents of the piece of physical equipment 118. The sensor in the sensor module 208 can monitor an amount, such as a volume or a weight, of the materials 212 for the piece of physical equipment. In examples in which the sensor is a pressure sensor or a force sensor, the processor 202 can use the sensor data 210 to determine whether the amount of the materials 212 is below a predetermined threshold. If so, the piece of physical equipment 118 can indicate that the amount of material 212 is low to the inventory management system, which may notify a well operator or automatically order more of the material 212 from a provider.

An AI module 214 in the memory 204 can be executed by the processor 202 to analyze the sensor data 210 using a machine-learning model 216. In some examples, more than one machine-learning model can be used to analyze the sensor data 210. Machine learning is a branch of AI that uses models to learn from, categorize, and make predictions about data. Such models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

In some examples, different machine-learning models may be used interchangeably to perform a task. Alternatively, certain machine-learning models may be specifically selected to perform a given task. The task can include predicting when an asset, such as a machine, will need maintenance.

The machine-learning model 216 can be positioned locally at a wellsite (e.g., the wellsite 100 of FIG. 1) for analyzing local input data, which can be data generated by devices that are physically present at the wellsite 100, such as sensor data from one or more pieces of physical equipment that are physically located at the wellsite 100. In some examples, the local input data can be generated by wellsite equipment that lack the machine-learning model 216. For example, the wellsite equipment may have limited computing resources (e.g., processing power or memory) that are unable to support the machine-learning model 216. Instead of analyzing local input data using machine learning, the wellsite equipment can collect local input data that is transmitted to the machine-learning model 216 for analysis. Examples of the local input data can include availability of chemical compounds for the wellbore operation, usage rates of the chemical compounds, loss rates, or the like. The local input data may require quicker response times from the machine-learning model 216 compared to remote input data, which can be data generated by devices that are not physically present at the wellsite 100 (e.g., that are positioned offsite).

Additionally or alternatively, the machine-learning model 216 can be stored remotely, such as in a cloud computing system, for analyzing the remote input data that is relatively less time sensitive. Examples of the remote input data can include maintenance data, debugging information, calibration files, or the like. The remote input data can be generated offsite, such as at a different wellsite. In some examples, the remote input data may be derived from local input data. For example, local input data can be transmitted from the wellsite 100 to a centralized computing system that is positioned offsite. The centralized computing system generate the remote input data based on the local input data. The remote input data can then be transmitted from the centralized computing system back to a device at the wellsite 100, such as to the physical equipment at the wellsite 100, for further processing.

Machine-learning models can be constructed through an at least partially automated (e.g., with little or no human involvement) process called training. During training, training data 218 can be iteratively supplied to the machine-learning model 216 to enable the machine-learning model 216 to identify patterns related to the training data 218 or to identify relationships between the training data 218 and output data. The machine-learning models can be at least partially trained offsite before being implemented at the wellsite. Additionally or alternatively, the machine-learning models may be at least partially trained at the wellsite. With training, the machine-learning model 216 can be transformed from an untrained state to a trained state. The training data 218 can be split into one or more training sets and one or more validation sets, and the training process may be repeated multiple times. The splitting may follow a k-fold cross-validation rule, a leave-one-out-rule, a leave-p-out rule, or a holdout rule.

In some examples, the training data 218 can be acquired by the sensor module 208, constructed from various subsets of data, or input by a trainer. The various subsets of data can include data from a previous wellbore operation, theoretical data for a future wellbore operation, or a combination of these. As more wellbore operations are performed over time, the training data 218 can be updated for further tuning the machine-learning model 216. The training data 218 can be used in its raw form for training the machine-learning model 216 or pre-processed into another form, which can then be used for training the machine-learning model 216. For example, the raw form of the training data 218 can be smoothed, truncated, aggregated, clustered, or otherwise manipulated into another form, which can then be used for training the machine-learning model 216.

The machine-learning model 216 can be trained in a supervised, unsupervised, or semi-supervised manner. In supervised training, each input in the training data 218 is correlated to a desired output. This desired output may be a scalar, a vector, or a different type of data structure, such as text or an image. Correlating each input to the desired output may enable the machine-learning model 216 to learn a mapping between the inputs and desired outputs. In unsupervised training, the training data 218 includes inputs, but not desired outputs, so that the machine-learning model 216 has to find structure in the inputs on its own. In semi-supervised training, only some of the inputs in the training data 218 are correlated to desired outputs.

After analyzing the sensor data 210 using the machine-learning model 216, the processor 202 can determine a condition 120 associated with the piece of physical equipment 118. The condition 120 can be determined based on at least one parameter 220 that is detected by the sensor module 208. In some examples, the parameter 220 can include an operational setting of the physical equipment 118, such as its pump rate or available storage capacity. In other examples, the parameter 220 can include a characteristic of the material 212, such as a fluid's density, viscosity, weight, or components. In some examples, the condition 120 can involve the parameter 220 meeting or exceeding a predefined threshold 222. More than one predefined threshold may be associated with the parameter 220. Additionally or alternatively, more than one parameter 220 may be associated with the condition 120. For example, if the parameter 220 is a flow rate, the flow sensor can detect the flow rate exceeding the predefined threshold 222, which can cause increased dilution downstream. Alternatively, the condition 120 can involve the parameter 220 being below the predefined threshold 222. For example, if the parameter 220 is a concentration of a fluid component, the conductivity sensor can detect the concentration being below the predefined threshold 222. Based on the condition 120, the piece of physical equipment 118 may adjust at least one of its settings.

A communications module 224 can be included in the piece of physical equipment 118 for transmitting a communication (e.g., the communication 122 of FIG. 1) to a destination (e.g., the destination 124 of FIG. 1). In some examples, the destination can include a client device 228 associated with a user 226. Alternatively, the communication can be transmitted to another piece of physical equipment positioned at the wellsite. Additionally, the communications module 224 may receive communications from the client device 228 or another suitable computing device. At least part of the communications module 224 can be implemented in software. For example, the communications module 224 can include instructions stored in the memory 204.

The communications module 224 can control a wired or wireless interface for communicating with the client device 228. For example, the communications module 224 can transmit commands to a wireless interface for engaging in wireless communications. The wired or wireless interface can include one or more components that facilitate a network connection, such as a connection to a local area network (LAN) or a wide area network (WAN). In some examples, the wireless interface may communicate via IEEE 802.11, Bluetooth, or radio interfaces for accessing cellular telephone networks (e.g., transceiver/antenna for accessing a CDMA, GSM, UMTS, or other mobile communications network). The wireless interface may alternatively use acoustic waves, mud pulses, surface waves, vibrations, optical waves, or induction (e.g., magnetic induction) for engaging in wireless communications. Examples of wired interfaces may include Ethernet, USB, IEEE 1394, or a fiber optic interface.

In some examples, a power source (not depicted) can be included in the piece of physical equipment 118. The piece of physical equipment 118 can operate the power source to apply a transmission signal to the wired or wireless interface. For example, the processor 202 can cause the power source to apply a voltage with a frequency within a specific frequency range to the antenna. Applying the voltage can cause the antenna to generate a wireless communication (e.g., an electromagnetic signal for transmitting the communication to the client device 228).

In some examples, multiple pieces of physical equipment can communicate with each other via respective communications modules (e.g., the communications module 224 for the piece of physical equipment 118) in the pieces of physical equipment. The pieces of physical equipment can combine respective sensor data collected by respective sensor modules (e.g., the sensor module 208 for the piece of physical equipment 118) into a shared sensor data set that each piece of physical equipment can access. The shared sensor data set can be analyzed by one or more AI modules using machine learning to detect higher-level patterns that suggest issues (e.g., malfunctioning, deterioration, or the like) associated with the pieces of physical equipment 118. The issues may affect a single piece of physical equipment or multiple pieces of physical equipment.

In addition to communicating with the client device 228 using the communications module 224, the piece of physical equipment 118 can use a warning module 230 for outputting a warning notification 232. The warning module 230 can include software that is executable by the processor 202 to determine that a warning should be output based on the condition 120. The piece of physical equipment 118 can also output content generated by the warning module 230. For example, the piece of physical equipment 118 can include a display screen configured to output a visible warning notification to a viewer, a speaker configured to output an auditory warning notification, or both. In some examples, the warning notification 232 can be transmitted to the client device 228 for delivery to a user 226. An audible alarm may accompany the warning notification 232 for alerting the user 226 about the operational problem 234.

The warning module 230 can be configured to determine that a warning is to be output in response to detecting one or more events. For example, the warning notification 232 can be outputted in response to the parameter 220 exceeding the predefined threshold 222. Additionally or alternatively, the warning module 230 can output the warning notification 232 because of the parameter 220 being below the predefined threshold 222. The warning notification 232 can indicate an operational problem 234 associated with the piece of physical equipment 118. The operational problem 234 may include a current operational problem or a future operational problem arising as a result of the condition 120.

In some examples, the processor 202 can execute the warning module 230 to output the warning notification 232 after the communications module 224 receives communication from another piece of physical equipment. Information contained in the communication may be used to detect the one or more events. For example, if a first piece of physical equipment is a shale shaker and a second piece of physical equipment is a cuttings box, the cuttings box may receive cuttings screened out of liquid mud by the shale shaker. After detecting a hole in a shaker screen, the shale shaker can transmit communication to the cuttings box. In response, the cuttings box can output the warning notification 232 to warn onsite personnel monitoring the cuttings in the cuttings box that abnormalities, (e.g., size, shape, distribution, or the like) with respect to the cuttings may be present due to the hole in the shaker screen. For example, the cuttings box may determine that there is excessive mud on the cuttings based on the communication from the shale shaker, thereby causing the cuttings box to output the warning notification 232 to the onsite personnel. The cuttings box additionally may contain a camera that monitors size of cuttings in the cuttings box to provide support with respect to the warning notification 232.

In some examples, the operational problem 234 can include a suspected deterioration of the piece of physical equipment 118. The deterioration of the piece of physical equipment 118 can be determined by analyzing sensed parameters 220 (e.g., vibration signals, flow rate, volume, weight, or the like). For example, if the piece of physical equipment 118 is a tank, a camera can be positioned in the tank to collect optical signals that can be used to monitor a fluid level inside of the tank. Leaking, such as through a perforation or loose piping, can be detected in response to the fluid level decreasing below the predefined threshold 222.

After receiving the warning notification 232, such as via a user interface, an operator may perform one or more remediations steps. For example, if the piece of physical equipment 118 is a shaker, the processor 202 can detect a hole in a screen of the shaker by analyzing vibration signals from the sensor module 208 of the shaker using the AI module 214. After detecting the hole, the warning module 230 can output the warning notification 232 to alert the operator regarding the hole. Subsequently, the operator can replace the screen or otherwise remediate the operational problem 234.

Additionally or alternatively, the client device 228 can receive the warning notification 232 for warning the user 226 associated with the client device 228 regarding the operational problem 234 associated with the piece of physical equipment 118. For example, the warning notification 232 can be received by a client device 228 associated with a manager of the inventory management system. The warning notification 232 can inform the manager that the amount of the materials 212 has decreased below the predefined threshold 222. Accordingly, the warning notification 232 may provide notice regarding the future operational problem.

In some examples, the warning notification 232 can cause the client device 228 or the piece of physical equipment 118 to perform the one or more remediation steps. For example, if the operational problem 234 involves the amount of materials 212, the client device 228 can automatically generate an order for the materials 212. An amount of the materials 212 that are ordered can be determined using the sensor data 210 from the sensor module 208. For example, the processor 202 can determine a usage rate of the materials 212 based on analyzing the sensor data 210 using the machine-learning model 216. From the usage rate, the processor 202 can generate a suggested amount of the materials 212 to order.

Although FIG. 2 shows a certain number and arrangement of components, this example is intended to be illustrative and non-limiting. Other examples may include more components, fewer components, different components, or a different arrangement of the components shown in FIG. 2. For instance, the training data 218 may be stored external to the piece of physical equipment 118, such as in the client device 228. Any suitable arrangement of the depicted components is contemplated herein.

Figure 3:
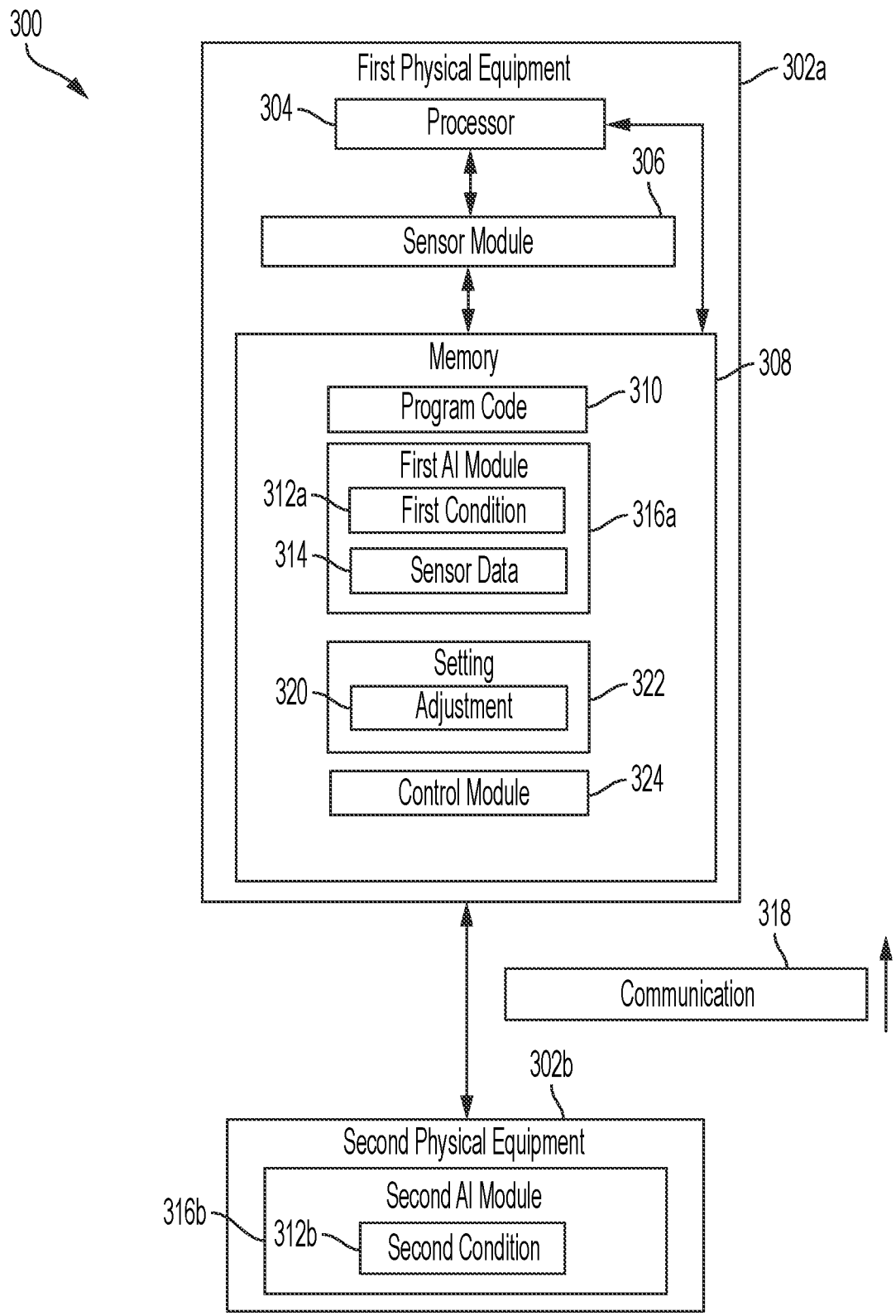
FIG. 3 is a block diagram of an example of two pieces of physical equipment communicating with one another for implementing some aspects of the present disclosure.

FIG. 3 is a block diagram of an example of two pieces of physical equipment communicating with one another for implementing some aspects of the present disclosure. As depicted in FIG. 3, the system 300 includes a first piece of physical equipment 302a and a second piece of physical equipment 302b. The first piece of physical equipment 302a or the second piece of physical equipment 302b can represent the piece of physical equipment 118 depicted in FIG. 2. Components of FIG. 3 are described below with reference to the components of FIG. 2 described above.

The first piece of physical equipment 302a can include a processor 304 communicatively coupled to a sensor module 306 and a memory 308. The memory 308 can include program code 310 that is executed by the processor 304 to perform operations. For example, the processor 304 can determine a first condition 312a with respect to the first piece of physical equipment 302a after receiving sensor data 314 from the sensor module 306. The first condition 312a can be determined by analyzing the sensor data using a first AI module 316 stored in the memory 308.

In some examples, the second piece of physical equipment 302b can be positioned at a wellsite (e.g., the wellsite 100 of FIG. 1) with the first piece of physical equipment 302a. Additionally, the second piece of physical equipment 302b can include similar components as the first piece of physical equipment 302a, such as a second processor communicatively coupled to a second sensor module and a second memory. The second piece of physical equipment 302b additionally can include a second AI module 316b that can determine a second condition 312b using a second set of sensor data. The second set of sensor data can be outputted by a second sensor module in the second piece of physical equipment 302b. After analyzing the second set of sensor data, the second AI module 316b can determine the second condition 312b with respect to the second piece of physical equipment 302b. The second piece of physical equipment 302b can transmit the second condition 312b via a communication 318 to the first piece of physical equipment 302a. The communication 318 can be transmitted using a communications module (e.g., the communications module 224 of FIG. 2) or another suitable communications device.

Through communication between the first piece of physical equipment 302a and the second piece of physical equipment 302b, the pieces of physical equipment 302a-b can adjust their settings to improve system-level performance. In some examples, after receiving the communication 318 from the second piece of physical equipment 302b, the first piece of physical equipment 302a can apply an adjustment 320 to a setting 322 of the first piece of physical equipment 302a. The adjustment 320 can be determined using a control module 324 stored in the memory 308 of the first piece of physical equipment 302a based on the first condition 312a and the second condition 312b. To apply the adjustment 320, the processor 304 can execute the control module 324 to modify the setting 322 of the first piece of physical equipment 302a.

For example, the first piece of physical equipment 302a can be a pump, while the second piece of physical equipment 302b can be a tank positioned downstream of the pump. The pump can adjust a flow rate of an inlet component for the tank that affects viscosity of an outlet flow for the tank. The tank can determine that the viscosity of the outlet flow for the tank has exceeded a predefined threshold (e.g., the predefined threshold 222 of FIG. 2). In response, the tank can communicate with the pump to decrease the flow rate of the inlet component to lower the viscosity of the outlet flow such that the viscosity is below the predefined threshold.

In some examples, the first piece of physical equipment 302a may store materials that feed into the second piece of physical equipment 302b. The first piece of physical equipment 302a can warn the second piece of physical equipment 302b when an amount of the materials in the first piece of physical equipment 302a decreases below the predefined threshold. In response, the second piece of physical equipment 302b can inform an operator to switch an inlet stream of the second piece of physical equipment 302b from the first piece of physical equipment 302a. The inlet stream can be switched to another piece of physical equipment with similar materials as the first piece of physical equipment 302a.

For example, if the first piece of physical equipment 302a is a pallet of lost-circulation material and the second piece of physical equipment 302b is a pump, the pallet of lost-circulation material can be fed as an inlet stream for the pump to add the lost-circulation material to drilling fluids. The pallet may be physical equipment that can predict a threshold time at which the amount of lost-circulation material stored in the pallet will fall below the predefined threshold. Predicting the threshold time can involve analyzing sensor data (e.g., sensor data 210 of FIG. 2) from the pallet, the pump, or a combination of these. For example, the pallet can provide sensor data associated with the amount of lost-circulation material remaining on the pallet, while the pump can provide sensor data associated with a usage rate of the lost-circulation material. To provide relatively ample time for the operator to change the inlet stream for the pump, the pallet can warn the pump at a predetermined time prior to the threshold time. For example, the pallet can warn the pump hours, days, or the like prior to the threshold time.

Figure 4:
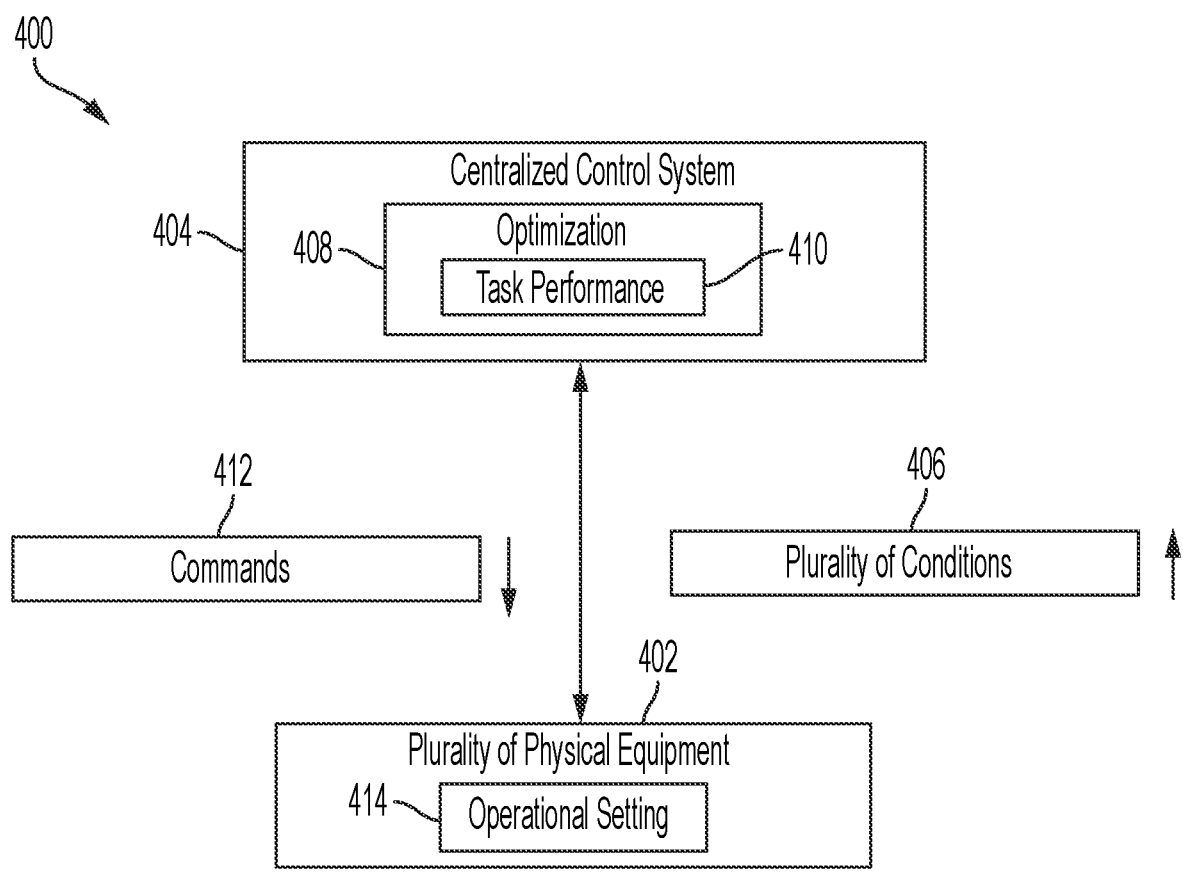
FIG. 4 is a block diagram of another example of a centralized control system interacting with multiple pieces of physical equipment that have artificial intelligence capabilities according to some aspects of the present disclosure.

FIG. 4 is a block diagram of another example of a centralized control system 404 interacting with multiple pieces of physical equipment 402 that have AI capabilities according to some aspects of the present disclosure. The centralized control system 404 can be an example of the destination 124 depicted in FIG. 1. An example of the piece of physical equipment 402 can include the piece of physical equipment 118 depicted in FIG. 2.

The centralized control system 404 can be separate from the piece of physical equipment 402 and can receive at least one condition 406 from the piece of physical equipment 402. In some examples, the centralized control system 404 can be positioned at a wellsite (e.g., the wellsite 100 of FIG. 1) for the wellbore operation. Alternatively, the centralized control system 404 can be located remotely from the wellsite. The pieces of physical equipment 402 can transmit data, such as sensor data and/or detected conditions, to the centralized control system 404.

Using the data from the pieces of physical equipment 402, the centralized control system 404 can determine an optimization 408. In some examples, determining the optimization 408 can involve machine learning, which can be implemented using a machine-learning model (e.g., the machine-learning model 216 of FIG. 2). The data from the pieces of physical equipment 402 can be inputted in the machine-learning model to output the optimization 408 after one or more iterations through the machine-learning model. The centralized control system 404 may use more than one machine-learning model 216 such that each machine-learning model is trained to determine a respective adjustment to apply to a respective piece of physical equipment.

Additionally or alternatively, the centralized control system 404 can use at least one lookup table to determine the optimization 408. The lookup table can map input values to outputs values such that a lookup operation can retrieve corresponding output values in response to receiving the input values. The input values can be the data from the pieces of physical equipment 402, while the output values can be used to determine the optimization 408. In some examples, if the lookup table lacks the input values, the centralized control system 404 can estimate the output values. For example, the centralized control system 404 can use interpolation to estimate output values that lie between known data points or extrapolation to estimate output values that lie beyond a range of known output values. Rounding can be used to approximate the output values by altering the output values according to a known rule. In some examples, the lookup table may be generated to correspond to a specific piece of physical equipment, enabling the centralized control system 404 to determine a specific adjustment for the specific piece of equipment.

The optimization 408 can be an adjustment that is to be applied to one or more pieces of physical equipment 402, for example, to improve at least one aspect of the well operation. For example, the optimization 408 may be configured to improve task performance 410 for a task associated with the wellbore operation. In some examples in which the wellbore operation is a drilling operation, improving the task performance 410 may include increasing an efficiency of drilling a wellbore (e.g., the wellbore 102 of FIG. 1). For example, the centralized control system 404 can determine the optimization 408 to adjust how a tank dispenses fluid based on a depth of a wellbore (e.g., the wellbore 102 of FIG. 1). Improving the task performance 410 can result in using less time to drill the wellbore, using less materials in the drilling operation, using relatively cost-efficient materials in the drilling operation, or a combination of these.

To apply the optimization 408 to a piece of physical equipment 402, the centralized control system 404 can transmit commands 412 to the piece of physical equipment 402. In some examples, the centralized control system 404 may transmit one command to the piece of physical equipment 402. The piece of physical equipment 402 can adjust at least one operational setting 414 in response to receiving the commands 412. A control module (e.g., the control module 324 of FIG. 3) can be used to modify the operational setting 414 based on the commands 412 to adjust the piece of physical equipment 402. For example, the optimization 408 may involve lowering an overall cost associated with the wellbore operation. Accordingly, the centralized control system 404 can determine which compounds used in the wellbore operation are most expensive. Based on which compounds are most expensive, the centralized control system can then generate the commands 412 for adjusting the operational setting 414 of the piece of physical equipment 402 to decrease consumption of those components and thereby reduce the overall cost. As one specific example in which the component is an expensive fluid, decreasing consumption of a component may involve lowering a rate at which the fluid is pumped into the system.

In some examples in which more than one piece of physical equipment is controlled by the centralized control system 404, a first adjustment may conflict with a second adjustment. For example, the first adjustment associated with a first piece of physical equipment (e.g., the first piece of physical equipment 302a of FIG. 3) may conflict with the second adjustment associated with a second piece of physical equipment (e.g., the second piece of physical equipment 302b of FIG. 3). The centralized control system 404 may prioritize the first adjustment over the second adjustment based on a set of criteria. The set of criteria can be inputted by an operator, generated based on analyzing the sensor data 210, or a combination of these.

Figure 5:
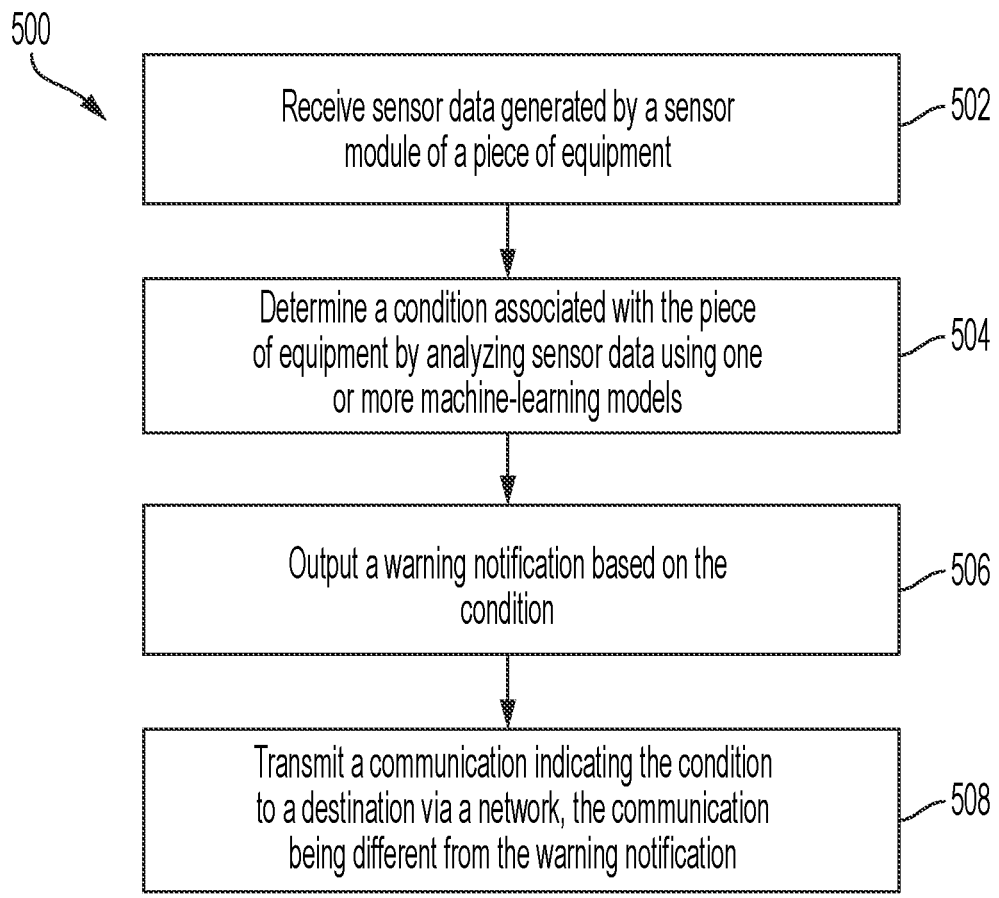
FIG. 5 is a flowchart of a process for monitoring a wellbore operation using artificial intelligence according to some aspects of the present disclosure.

FIG. 5 is a flowchart of a process 500 for monitoring a wellbore operation using artificial intelligence according to some aspects of the present disclosure. While FIG. 5 depicts a certain sequence of steps for illustrative purposes, other examples can involve more steps, fewer steps, different steps, or a different order of the steps depicted in FIG. 5. The steps of FIG. 5 are described below with reference to the components of FIGS. 1-4 described above.

In block 502, a piece of physical equipment 118 receives sensor data 210 generated by a sensor module 208 of the piece of physical equipment 118. The sensor module 208 can include a sensor positioned in the piece of physical equipment 118 for collecting the sensor data 210. Examples of the sensor data 210 can include density data, viscosity data, impedance data, flow rate data, vibrational data, or other suitable wellsite equipment data.

In block 504, the piece of physical equipment 118 executes the AI module 214 to determine a condition 120 associated with the piece of physical equipment 118 by analyzing the sensor data 210 using a machine-learning model 216. The AI module 214 may analyze the sensor data 210 with more than one machine-learning model 216. In some examples, to determine the condition 120, the machine-learning model can analyze the sensor data 210 to identify patterns or trends in the sensor data 210. Additionally, the condition 120 can be determined based on a parameter 220 associated with the piece of physical equipment 118. For example, the machine-learning model 216 can determine the condition 120 based on the parameter 220 with respect to a predefined threshold 222. In some instances, the condition 120 can be based on the parameter 220 exceeding the predefined threshold 222. In other instances, the condition 120 can be associated with the parameter 220 being below the predefined threshold 222.

In block 506, the piece of physical equipment 118 outputs a warning notification 232 based on the condition 120 by executing the warning module 230. The warning notification 232 can specify an operational problem 234 associated with the piece of physical equipment 118. The warning notification 232 may provide notice regarding the operational problem 234 before the operational problem 234 occurs. For example, if the piece of physical equipment 118 is a cuttings box, overfilling the cuttings box may cause a buildup of cuttings or waste drilling fluid at a wellsite (e.g., the wellsite 100 of FIG. 1). The warning notification 232 can be outputted to an operator when the cuttings box is 80% full. Additionally or alternatively, the warning module 230 can output the warning notification 232 after the predefined threshold 222 is exceeded.

In block 508, the piece of physical equipment 118 transmits a communication 122 indicating the condition 120 to a destination 124 by executing the communications module. The communication 122 can be transmitted to the destination 124 via a network 126, such as the Internet. In some examples, the communication 122 can include the communication 318 depicted in FIG. 3. Additionally, the communication 122 can differ from the warning notification 232. For example, the communication 122 can specify the condition 120 and can be transmitted to a first destination, whereas the warning notification 232 can specify the operational problem 234 and can be transmitted to a second destination that is different from the first destination.

In some examples, the piece of physical equipment 118 can be a first piece of physical equipment (e.g., the first piece of physical equipment 302a of FIG. 3), and the destination 124 can include at least one other piece of equipment, such as a second piece of equipment (e.g., the second piece of physical equipment 302b of FIG. 3). The first piece of equipment can adjust a first setting (e.g. the setting 322 of FIG. 3) of the first piece of physical equipment based on the condition 120. Similarly, the second piece of equipment can adjust a second setting of the second piece of physical equipment based on the condition 120 specified in the communication 122.

Additionally or alternatively, the destination 124 can include a centralized control system 404 for controlling the piece of physical equipment 118. The piece of physical equipment 118 can transmit the condition 120 to the centralized control system via the network 126 or another suitable communication system. Based on the condition 120, the centralized control system 404 can determine an optimization 408 that improves a task performance 410 associated with the piece of physical equipment 118 or another piece of physical equipment. To apply the optimization 408, the centralized control system 404 can transmit at least one command (e.g., the commands 412 of FIG. 4) to the piece of physical equipment 118 for adjusting an operational setting 414 of the piece of physical equipment 118.

In some aspects, a system, a method, and a non-transitory computer-readable medium for monitoring a wellbore operation using distributed artificial intelligence are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a system comprising: a plurality of pieces of physical equipment positioned at a surface of a wellsite, the plurality of pieces of physical equipment being usable to support a drilling operation at the wellsite, wherein each piece of equipment in the plurality of pieces of physical equipment includes: a sensor module; a processor communicatively coupled to the sensor module; and a memory including: an artificial intelligence (AI) module that is executable by the processor for causing the processor to determine a condition associated with the piece of equipment by analyzing sensor data from the sensor module using one or more machine-learning models; a warning module that is executable by the processor for causing the processor to output a warning notification based on the condition; and a communications module that is executable by the processor for causing the processor to transmit a communication indicating the condition to a destination via a network, the communication being different from the warning notification.

Example 2 is the system of example(s) 1, wherein the destination includes at least one other piece of equipment of the plurality of pieces of physical equipment, the at least one other piece of equipment being configured to adjust at least one of its settings based on the condition specified in the communication.

Example 3 is the system of example(s) 1-2, wherein the at least one other piece of equipment is configured to determine how to adjust the setting using its AI module.

Example 4 is the system of example(s) 1-3, wherein the destination is a centralized control system that is separate from the plurality of pieces of physical equipment, the centralized control system being configured to: receive a plurality of conditions of the plurality of pieces of physical equipment; based on the plurality of conditions, determine an optimization to be applied to the plurality of pieces of physical equipment, the optimization being configured to improve performance of a task associated with the drilling operation; and apply the optimization by transmitting commands to the plurality of pieces of physical equipment, the commands being configured to adjust at least one operational setting of at least one piece of equipment in the plurality of pieces of physical equipment.

Example 5 is the system of example(s) 1-4, wherein the warning module is configured to transmit the warning notification via the network to one or more client devices associated with one or more users, the warning notification being configured to warn the one or more users about a current or future operational problem associated with the piece of equipment as a result of the condition.

Example 6 is the system of example(s) 1-5, wherein the sensor module includes a camera, a temperature sensor, an inclinometer, a pressure sensor, a force sensor, a conductivity sensor, a capacitance sensor, a level sensor, a microphone, a guided wave radar, a resistivity sensor, a flow sensor, an accelerometer, or a radio frequency identification (RFID) reader.

Example 7 is the system of example(s) 1-6, wherein the condition involves at least one parameter detected by the sensor module meeting or exceeding a predefined threshold.

Example 8 is the system of example(s) 1-7, wherein the condition involves at least one parameter detected by the sensor module being below a predefined threshold.

Example 9 is the system of example(s) 1-8, wherein the memory further includes instructions that are executable by the processor for causing the processor to train at least a portion of the AI module using training data acquired using the sensor module.

Example 10 is the system of example(s) 1-9, wherein the plurality of pieces of physical equipment include a shaker, a centrifuge, a cuttings box, a mud tank, a pump, a sack, and a pallet.

Example 11 is a method comprising: receiving, by a piece of equipment, sensor data generated by a sensor module of the piece of equipment, wherein the piece of equipment is one of a plurality of pieces of physical equipment positioned at a surface of a wellsite to support a drilling operation at the wellsite, wherein each piece of equipment in the plurality of pieces of physical equipment includes: a respective sensor module; a respective processor communicatively coupled to the respective sensor module; and a respective memory including an artificial intelligence (AI) module, a warning module, and a communications module; determining, by the piece of equipment executing the AI module, a condition associated with the piece of equipment by analyzing the sensor data using one or more machine-learning models; outputting, by the piece of equipment executing the warning module, a warning notification based on the condition; and transmitting, by the piece of equipment executing the communications module, a communication indicating the condition to a destination via a network, the communication being different from the warning notification.

Example 12 is the method of example(s) 11, wherein the destination includes at least one other piece of equipment of the plurality of pieces of physical equipment, the at least one other piece of equipment being configured to adjust a setting based on the condition specified in the communication.

Example 13 is the method of example(s) 11-12, wherein the at least one other piece of equipment is configured to determine how to adjust the setting using its AI module.

Example 14 is the method of example(s) 11-13, wherein the destination is a centralized control system that is separate from the plurality of pieces of physical equipment, the centralized control system being configured to: receive a plurality of conditions of the plurality of pieces of physical equipment; based on the plurality of conditions, determine an optimization to be applied to the plurality of pieces of physical equipment, the optimization being configured to improve performance of a task associated with the drilling operation; and apply the optimization by transmitting commands to the plurality of pieces of physical equipment, the commands being configured to adjust at least one operational setting of at least one piece of equipment in the plurality of pieces of physical equipment.

Example 15 is the method of example(s) 11-14, wherein the warning module is configured to transmit the warning notification via the network to one or more client devices associated with one or more users, the warning notification being configured to warn the one or more users about a current or future operational problem associated with the piece of equipment as a result of the condition.

Example 16 is the method of example(s) 11-15, further comprising: determining an adjustment to be made to one or more settings of the piece of equipment based on the condition; and applying the adjustment to the piece of equipment by modifying the one or more settings of the piece of equipment.

Example 17 is the method of example(s) 11-16, wherein the condition involves at least part of the piece of equipment being broken.

Example 18 is the method of example(s) 11-17, further comprising training at least a portion of the AI module using training data acquired prior to deploying the piece of equipment at the wellsite.

Example 19 is the method of example(s) 11-18, wherein the plurality of pieces of physical equipment are configured to store, transmit, or manipulate materials that are to be used in the drilling operation.

Example 20 is a non-transitory computer-readable medium comprising program code that is executable by a processor of a first piece of physical equipment positionable at a surface of a wellsite to support a drilling operation, the program code being executable for causing the processor to: receive sensor data from a sensor module of the first piece of physical equipment; determine a first condition associated with the first piece of physical equipment by analyzing the sensor data using a first artificial intelligence (AI) module; receive a communication from a second piece of physical equipment positionable at the surface of the wellsite to support the drilling operation, the communication indicating a second condition of the second piece of physical equipment, the second condition being determined by the second piece of physical equipment using a second AI module of the second piece of physical equipment; determine an adjustment to be made to a setting of the first piece of physical equipment based on the first condition and the second condition; and apply the adjustment to the setting of the first piece of physical equipment.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
    a plurality of pieces of physical equipment positioned at a surface of a wellsite, the plurality of pieces of physical equipment being configured to perform physical tasks as part of a drilling operation at the wellsite, wherein each piece of equipment in the plurality of pieces of physical equipment includes:
        at least one piece of physical hardware configured to enable the piece of physical equipment to perform a physical task associated with the drilling operation;
        a sensor module;
        a processor communicatively coupled to the sensor module; and
        a memory including:
            an artificial intelligence (AI) module that is executable by the processor for causing the processor to determine a condition associated with the piece of equipment by analyzing sensor data from the sensor module using one or more machine-learning models;
            a warning module that is executable by the processor for causing the processor to output a warning notification based on the condition; and
            a communications module that is executable by the processor for causing the processor to transmit a communication indicating the condition to a destination via a network, the communication being different from the warning notification.

2. The system of claim 1, wherein the destination includes at least one other piece of equipment of the plurality of pieces of physical equipment, the at least one other piece of equipment being configured to adjust at least one of its settings based on the condition specified in the communication.

3. The system of claim 2, wherein the at least one other piece of equipment is configured to determine how to adjust the setting using its AI module.

4. The system of claim 1, wherein the destination is a centralized control system that is separate from the plurality of pieces of physical equipment, the centralized control system being configured to:
    receive a plurality of conditions of the plurality of pieces of physical equipment;
    based on the plurality of conditions, determine an optimization to be applied to the plurality of pieces of physical equipment, the optimization being configured to improve performance of a task associated with the drilling operation; and
    apply the optimization by transmitting commands to the plurality of pieces of physical equipment, the commands being configured to adjust at least one operational setting of at least one piece of equipment in the plurality of pieces of physical equipment.

5. The system of claim 1, wherein the warning module is configured to transmit the warning notification via the network to one or more client devices associated with one or more users, the warning notification being configured to warn the one or more users about a current or future operational problem associated with the piece of equipment as a result of the condition.

6. The system of claim 1, wherein the sensor module includes a camera, a temperature sensor, an inclinometer, a pressure sensor, a force sensor, a conductivity sensor, a capacitance sensor, a level sensor, a microphone, a guided wave radar, a resistivity sensor, a flow sensor, an accelerometer, or a radio frequency identification (RFID) reader.

7. The system of claim 1, wherein the condition involves at least one parameter detected by the sensor module meeting or exceeding a predefined threshold.

8. The system of claim 1, wherein the condition involves at least one parameter detected by the sensor module being below a predefined threshold.

9. The system of claim 1, wherein the memory further includes instructions that are executable by the processor for causing the processor to train at least a portion of the AI module using training data acquired using the sensor module.

10. The system of claim 1, wherein the plurality of pieces of physical equipment includes a shaker, a centrifuge, a cuttings box, a mud tank, a pump, a sack, and a pallet.

11. A method comprising:
receiving, by a piece of equipment, sensor data generated by a sensor module of the piece of equipment, wherein the piece of equipment is one of a plurality of pieces of physical equipment positioned at a surface of a wellsite, the plurality of pieces of physical equipment being configured to perform physical tasks as part of a drilling operation at the wellsite, wherein each piece of equipment in the plurality of pieces of physical equipment includes:
at least one piece of respective physical hardware configured to enable the piece of physical equipment to perform a physical task associated with the drilling operation;
a respective sensor module;
a respective processor communicatively coupled to the respective sensor module; and
a respective memory including an artificial intelligence (AI) module, a warning module, and a communications module;
determining, by the piece of equipment executing the AI module, a condition associated with the piece of equipment by analyzing the sensor data using one or more machine-learning models;
outputting, by the piece of equipment executing the warning module, a warning notification based on the condition; and
transmitting, by the piece of equipment executing the communications module, a communication indicating the condition to a destination via a network, the communication being different from the warning notification.

12. The method of claim 11, wherein the destination includes at least one other piece of equipment of the plurality of pieces of physical equipment, the at least one other piece of equipment being configured to adjust a setting based on the condition specified in the communication.

13. The method of claim 12, wherein the at least one other piece of equipment is configured to determine how to adjust the setting using its AI module.

14. The method of claim 11, wherein the destination is a centralized control system that is separate from the plurality of pieces of physical equipment, the centralized control system being configured to:
receive a plurality of conditions of the plurality of pieces of physical equipment;
based on the plurality of conditions, determine an optimization to be applied to the plurality of pieces of physical equipment, the optimization being configured to improve performance of a task associated with the drilling operation; and
apply the optimization by transmitting commands to the plurality of pieces of physical equipment, the commands being configured to adjust at least one operational setting of at least one piece of equipment in the plurality of pieces of physical equipment.

15. The method of claim 11, wherein the warning module is configured to transmit the warning notification via the network to one or more client devices associated with one or more users, the warning notification being configured to warn the one or more users about a current or future operational problem associated with the piece of equipment as a result of the condition.

16. The method of claim 11, further comprising:
determining an adjustment to be made to one or more settings of the piece of equipment based on the condition; and
applying the adjustment to the piece of equipment by modifying the one or more settings of the piece of equipment.

17. The method of claim 11, wherein the condition involves at least part of the piece of equipment being broken.

18. The method of claim 11, further comprising training at least a portion of the AI module using training data acquired prior to deploying the piece of equipment at the wellsite.

19. The method of claim 11, wherein the plurality of pieces of physical equipment are configured to store, transmit, or manipulate materials that are to be used in the drilling operation.

20. A non-transitory computer-readable medium comprising program code that is executable by a processor of a first piece of physical equipment positionable at a surface of a wellsite to perform a physical task as part of a drilling operation, the program code being executable for causing the processor to:
receive sensor data from a sensor module of the first piece of physical equipment;
determine a first condition associated with the first piece of physical equipment by analyzing the sensor data using a first artificial intelligence (AI) module;
receive a communication from a second piece of physical equipment positionable at the surface of the wellsite to support the drilling operation, the communication indicating a second condition of the second piece of physical equipment, the second condition being determined by the second piece of physical equipment using a second AI module of the second piece of physical equipment;
determine an adjustment to be made to a setting of a piece of physical hardware of the first piece of physical equipment based on the first condition and the second condition, the piece of physical hardware configurable to enable the first piece of physical equipment to perform the physical task; and
apply the adjustment to the setting of the piece of physical hardware of the first piece of physical equipment.

* * * * *